United States Patent
Wu et al.

(10) Patent No.: US 11,295,431 B2
(45) Date of Patent: Apr. 5, 2022

(54) METHOD AND APPARATUS FOR OBTAINING SAMPLE IMAGES, AND ELECTRONIC DEVICE

(71) Applicant: SENSETIME INTERNATIONAL PTE. LTD., Singapore (SG)

(72) Inventors: Jin Wu, Singapore (SG); Kaige Chen, Singapore (SG); Shuai Yi, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 16/900,245

(22) Filed: Jun. 12, 2020

(65) Prior Publication Data

US 2021/0192707 A1 Jun. 24, 2021

Related U.S. Application Data

(63) Continuation of application No. PCT/IB2020/052987, filed on Mar. 30, 2020.

(30) Foreign Application Priority Data

Dec. 23, 2019 (SG) .......................... 10201913056V (51) Int. Cl.
*G06T 7/00* (2017.01)
*G06T 7/187* (2017.01)
(Continued)

(52) U.S. Cl.
CPC ............. *G06T 7/0002* (2013.01); *G06N 3/08* (2013.01); *G06T 7/187* (2017.01); *G06T 7/60* (2013.01);
(Continued)

(58) Field of Classification Search
CPC ......... G06T 7/0002; G06T 7/187; G06T 7/60; G06T 2207/30168; G06N 3/08;
(Continued)

(56) References Cited

U.S. PATENT DOCUMENTS

| 7,901,285 | B2* | 3/2011 | Tran ........................ G07F 17/32 463/25 |
| 9,102,055 | B1* | 8/2015 | Konolige .................. G06T 7/13 |

(Continued)

FOREIGN PATENT DOCUMENTS

| CN | 109345522 A | 2/2019 |
| CN | 109671051 A | 4/2019 |

(Continued)

OTHER PUBLICATIONS

Search Report and Written Opinion for Singapore Application No. 10201913056V, dated Aug. 24, 2020, 6 pages.

(Continued)

*Primary Examiner* — Xuemei G Chen (57) ABSTRACT

Embodiments of the present disclosure provide methods and apparatuses for obtaining sample images, and electronic devices. The method includes: acquiring images of stacked bodies, where the stacked bodies in different images have different item information, and the item information comprises: an attribute and a stacking mode of a stacked body; and taking an acquired image as a sample image when the acquired image meets an image quality condition.

17 Claims, 2 Drawing Sheets

(51) Int. Cl.
  *G06N 3/08*    (2006.01)
  *G06T 7/60*    (2017.01)
  *A63F 1/06*    (2006.01)
  *A63F 1/18*    (2006.01)
  *A63F 1/00*    (2006.01)

(52) U.S. Cl.
  CPC ............ *A63F 1/067* (2013.01); *A63F 1/18* (2013.01); *A63F 2001/005* (2013.01); *G06T 2207/30168* (2013.01)

(58) Field of Classification Search
  CPC . G06N 20/00; A63F 1/067; A63F 1/18; A63F 2001/005; G06K 9/00624; G06K 9/3233; G06K 9/627; G06K 9/6256; G06K 2209/21
  See application file for complete search history.

(56) References Cited

U.S. PATENT DOCUMENTS

| | | | |
|---|---|---|---|
| 2006/0160608 A1 | 7/2006 | Hill et al. | |
| 2013/0292902 A1* | 11/2013 | Shigeta | A63F 1/10 273/148 R |
| 2017/0039807 A1* | 2/2017 | Shigeta | G07F 17/3251 |
| 2017/0193430 A1* | 7/2017 | Barreira Avegliano | G06T 7/74 |
| 2018/0068525 A1* | 3/2018 | Shigeta | G07F 17/3237 |
| 2018/0070687 A1* | 3/2018 | Shigeta | G07F 17/32 |
| 2018/0075698 A1* | 3/2018 | Shigeta | G07F 17/3248 |
| 2018/0114406 A1* | 4/2018 | Shigeta | A63F 1/18 |
| 2018/0144498 A1* | 5/2018 | Sugahara | G06T 7/11 |
| 2018/0144579 A1* | 5/2018 | Shigeta | G06K 19/07758 |
| 2018/0185741 A1* | 7/2018 | Shigeta | G07F 17/3241 |
| 2018/0211472 A1* | 7/2018 | Shigeta | G07F 17/3272 |
| 2018/0239984 A1* | 8/2018 | Shigeta | G06K 9/4652 |
| 2019/0147689 A1* | 5/2019 | Shigeta | G07F 17/3293 463/25 |
| 2019/0213406 A1* | 7/2019 | Porikli | G06K 9/00355 |
| 2019/0228495 A1* | 7/2019 | Tremblay | G06T 1/0014 |
| 2019/0236891 A1* | 8/2019 | Shigeta | G07F 17/3241 |
| 2019/0347893 A1* | 11/2019 | Shigeta | G07C 9/00 |
| 2020/0051272 A1* | 2/2020 | Mukherjee | G06T 7/155 |
| 2020/0130961 A1* | 4/2020 | Diankov | G06K 9/3233 |
| 2020/0388109 A1† | 12/2020 | Shigeta | |
| 2021/0097278 A1* | 4/2021 | Liu | G06K 9/6807 |

FOREIGN PATENT DOCUMENTS

| | | |
|---|---|---|
| CN | 109771931 A | 5/2019 |
| CN | 111527528 A | 8/2020 |
| CN | 111971685 A | 11/2020 |
| JP | 2004-213567 A | 7/2004 |
| JP | 2004213567 A † | 7/2004 |
| WO | 2019/068141 A1 | 4/2019 |
| WO | 2019068141 A1 † | 4/2019 |
| WO | 2019/097976 A1 | 5/2019 |

OTHER PUBLICATIONS

International Search Report and Written Opinion issued in Application No. PCT/IB2020/052987, dated Sep. 16, 2020, 9 pages.
Search Report and Written Opinion for Singapore Application No. 10201913056V, dated Feb. 3, 2020, 8 pages.
Macao Intellectual Property Office, Office Action Issued in Application No. I/1671, dated Nov. 30, 2021, 25 pages.
Macao Intellectual Property Office, Disagreement Issued in Application No. I/1671, dated Dec. 16, 2021, 26 pages.

\* cited by examiner
† cited by third party

METHOD AND APPARATUS FOR OBTAINING SAMPLE IMAGES, AND ELECTRONIC DEVICE

CROSS-REFERENCE TO RELATED APPLICATION

The present application is a continuation of International Application No. PCT/IB2020/052987, filed on Mar. 30, 2020, which claims a priority of the Singaporean patent application No. 10201913056V filed on Dec. 23, 2019, all of which are incorporated herein by reference in their entirety.

TECHNICAL FIELD

The present disclosure relates to a machine learning technology, and specifically relates to methods and apparatuses for obtaining sample images, and electronic devices.

BACKGROUND

In recent years, with continuous development of an artificial intelligence technology, the artificial intelligence technology achieves good effects in aspects such as computer vision and speech recognition. Game currencies used in a game are required for recognizing in some relatively special scenes such as a tabletop game scene. Automatically recognizing game currencies in a game is also an important research topic for constructing an intelligent game place. Moreover, as a precondition of recognizing game currencies in a game, acquiring a sample image including a game currency for training a recognition network to recognize game currencies is an essential step. The quality of the sample image directly affects the precision of game currency recognition.

SUMMARY

In view of this, the present disclosure at least provides a method and apparatus for obtaining sample images, and an electronic device.

According to a first aspect, provided is a method for obtaining sample images, including:

acquiring images of stacked bodies, where the stacked bodies in different images have different item information, and the item information includes: an attribute and a stacking mode of a stacked body; and taking an acquired image as a sample image when the acquired image meets an image quality condition.

According to any one of embodiments of the present disclosure, the method further includes: determining that distribution data of item information of stacked bodies in sample images of a sample image set does not meet a predetermined distribution condition, the sample image set including multiple sample images; and acquiring a missing image which is an image of a stacked body having missing item information not included in the distribution data but included in the predetermined distribution condition.

According to any one of embodiments of the present disclosure, after acquiring the missing image, the method further includes: taking the missing image as a sample image when the missing image meets the image quality condition.

According to any one of embodiments of the present disclosure, the stacking mode includes: a stacking direction, a stacking area, a neighboring relation among objects constituting the stacked body, and the number of objects in the stacked body; the attribute of the stacked body includes: a value represented by each object constituting the stacked body and a type of each object; stacked bodies in different sample images are different from each other in at least one of: a stacking direction, a stacking area, a neighboring relation among objects constituting a stacked body, the number of objects in a stacked body, a value represented by each object constituting a stacked body or a type of each object.

According to any one of embodiments of the present disclosure, acquiring images of stacked bodies includes: acquiring N image subsets, where stacked bodies in images of the same image subset have the same first attribute, the first attribute is one of the value and the type, N is a natural number, and stacked bodies in images of different image subsets have different first attributes; where the attributes of stacked bodies in images of one of the N image subsets include different possible combinations of second attributes, the attribute of the stacked body is determined by a second attribute of each object constituting the stacked body, and the second attribute is one of the value and the type other than the first attribute.

According to any one of embodiments of the present disclosure, when the stacking direction is parallel to a surface on which the stacked body is placed, acquiring images of stacked bodies includes: acquiring images of stacked bodies at an overhead view of the surface.

According to any one of embodiments of the present disclosure, when the stacking direction is perpendicular to the surface on which the stacked body is placed, acquiring images of stacked bodies includes: acquiring images of stacked bodies at a side view of the surface.

According to any one of embodiments of the present disclosure, taking the acquired image as the sample image when the acquired image meets the image quality condition includes: for each of target objects in the acquired image, determining a bounding box of the target object, the target objects including a stacked body; for each of the target objects other than the stacked body, determining that an Intersection over Union between a bounding box of the stacked body and a bounding box of the target object is less than a first predetermined threshold; and taking an acquired image as the sample image.

According to any one of embodiments of the present disclosure, after determining that the Intersection over Union between the bounding box of the stacked body and the bounding box of each of the target objects other than the stacked body is less than the first predetermined threshold, and before taking the acquired image as the sample image, the method further includes: taking the bounding box of the stacked body as a first bounding box; for each of the target objects other than the stacked body in the acquired image, taking the bounding box of the target object as a second bounding box; determining that a ratio of a length of an overlapping area between the first bounding box and the second bounding box in a direction perpendicular to a stacking direction of the stacked body to a length of the first bounding box in the direction perpendicular to the stacking direction of the stacked body is less than a second predetermined threshold.

According to a second aspect, provided is an apparatus for obtaining sample images, including:

an image acquisition module, configured to acquire images of stacked bodies, where the stacked bodies in different images have different item information, and the item information includes: an attribute and a stacking mode of a stacked body; and an image filtering module, configured to take an acquired image as a sample image when the acquired image meets an image quality condition.

According to any one of embodiments of the present disclosure, the image acquisition module is further configured to acquire a missing image when it is determined that distribution data of item information of stacked bodies in sample images of a sample image set does not meet a predetermined distribution condition, where the missing image is an image of a stacked body having missing item information not included in the distribution data but included in the predetermined distribution condition; the sample image set including multiple sample images.

According to any one of embodiments of the present disclosure, the image filtering module is further configured to take the missing image as a sample image when the missing image meets the image quality condition.

According to any one of embodiments of the present disclosure, the stacking mode includes: a stacking direction, a stacking area, a neighboring relation among objects constituting the stacked body, and the number of objects in the stacked body; the attribute of the stacked body includes: a value represented by each object constituting the stacked body and a type of each object; stacked bodies in different sample images are different from each other in at least one of: a stacking direction, a stacking area, a neighboring relation among objects constituting a stacked body, the number of objects in a stacked body, a value represented by each object constituting a stacked body or a type of each object.

According to any one of embodiments of the present disclosure, the image acquisition module is configured to acquire N image subsets, where stacked bodies in images of the same image subset have the same first attribute, the first attribute is one of the value and the type, N is a natural number, and stacked bodies in images of different image subsets have different first attributes; where the attributes of stacked bodies in images of one of the N image subsets include different possible combinations of second attributes, the attribute of the stacked body is determined by a second attribute of each object constituting the stacked body, and the second attribute is one of the value and the type other than the first attribute.

According to any one of embodiments of the present disclosure, the image acquisition module is configured to, when the stacking direction is parallel to a surface on which the stacked body is placed, acquire images of stacked bodies at an overhead view of the surface.

According to any one of embodiments of the present disclosure, the image acquisition module is configured to, when the stacking direction is perpendicular to the surface on which the stacked body is placed, acquire images of stacked bodies at a side view of the surface.

According to any one of embodiments of the present disclosure, the image filtering module is specifically configured to for each of target objects in the acquired image, determine a bounding box of the target object, the target objects including a stacked body; for each of the target objects other than the stacked body, determine that an Intersection over Union between a bounding box of the stacked body and a bounding box of the target object is less than a first predetermined threshold; and take the acquired image as the sample image.

According to any one of embodiments of the present disclosure, the image filtering module is further configured to, after determining that the Intersection over Union between the bounding box of the stacked body and the bounding box of each of the target objects other than the stacked body is less than the first predetermined threshold, and before taking the acquired image as the sample image, take the bounding box of the stacked body as a first bounding box; for each of the target objects other than the stacked body in the acquired image, take the bounding box of the target object as a second bounding box; determine that a ratio of a length of an overlapping area between the first bounding box and the second bounding box in a direction perpendicular to a stacking direction of the stacked body to a length of the first bounding box in the direction perpendicular to the stacking direction of the stacked body is less than a second predetermined threshold.

According to a third aspect, provided is an electronic device, including a memory and a processor, where the memory is configured to store computer instructions runnable on the processor, and the processor is configured to implement the method according to any one of embodiments of the present disclosure when the computer instructions are executed.

According to a fourth aspect, provided is a computer-readable storage medium. A computer program is stored thereon, and when the program is executed by a processor, the method according to any one of embodiments of the present disclosure is implemented.

According to the methods and apparatuses for obtaining sample images, and electronic devices provided in embodiments of the present disclosure, the item information included in the acquired sample images is relatively rich by acquiring multiple images having different item information. Moreover, the quality of the sample images can also be further improved by selecting the acquired images of better quality, so that the sample images which are of better quality and includes rich item information are used for training a neural network, and the performance of the neural network to recognizing objects in a stacked body is improved, for example, the accuracy and the generalization capability of a recognition network to recognize objects in a stacked body are improved.

BRIEF DESCRIPTION OF THE DRAWINGS

To describe the technical solutions in one or more embodiments of the present disclosure or the related art more clearly, the accompanying drawings for describing the embodiments or the related art are briefly introduced below. Apparently, the accompanying drawings in the following description show merely some embodiments described in the one or more embodiments of the present disclosure, and a person of ordinary skill in the art can still derive other accompanying drawings from these accompanying drawings without involving an inventive effort.

DETAILED DESCRIPTION OF THE EMBODIMENTS

To make a person skilled in the art better understand the technical solutions in one or more embodiments of the present disclosure, the technical solutions in the one or more embodiments of the present disclosure are clearly and fully described below with reference to the accompanying drawings in the one or more embodiments of the present disclosure. Apparently, the described embodiments are merely some of the embodiments of the present disclosure, but not all the embodiments. Based on the one or more embodiments of the present disclosure, all other embodiments obtained by a person of ordinary skill in the art without involving an inventive effort shall fall within the scope of protection of the present disclosure.

Embodiments of the present disclosure provide a method for obtaining sample images. The method can be used for obtaining a sample image. The sample image can be, for example, used for training a neural network.

The sample image can include a stacked body. The stacked body can include multiple objects stacked together, for example, multiple game currencies stacked together, or multiple sheet-like objects such as multiple coins stacked together. However, when the sample image is used for training a neural network, the neural network trained with the sample image can be used for recognizing the stacked body (i.e., recognizing objects constituting the stacked body).

Figure 1:
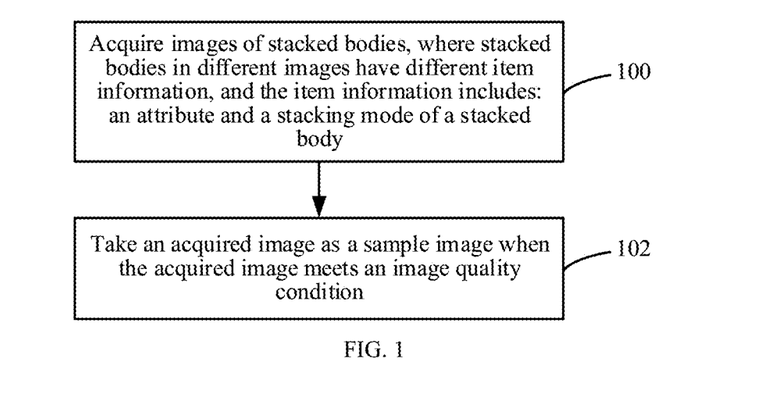
FIG. 1 is a flowchart of a method for obtaining sample images provided by at least one embodiment of the present disclosure.

FIG. 1 shows a flowchart of a method for obtaining sample images provided by at least one embodiment of the present disclosure. As shown in FIG. 1, the method includes the following steps 100-102.

At step 100, images of stacked bodies are acquired, where the stacked bodies in different images have different item information, and the item information includes: an attribute and a stacking mode of a stacked body.

At this step, multiple images can be acquired. Each image can include a stacked body. Stacked bodies in different images can be different from each other in at least one of the following item information: for example, the attributes of stacked bodies in different images are different, or the stacking modes of stacked bodies in different images are different, or both the attributes and the stacking modes are different.

In an example, the attribute of the stacked body may include: the value represented by each object constituting the stacked body and a type of each object. Taking a stacked body including multiple coins stacked together as an example, the value can be the denomination of a coin, for example, 1 RMB coin and 5 RMB coin. The type can be the type of a coin (for example, coins in different countries; a coin in each country is of the same type). For example, coins can be of multiple types, and the stacked body can include coins of different types.

In an example, the stacking mode of the stacked body can include: a stacking direction, a stacking area, a neighboring relation among objects constituting the stacked body, and the number of objects in the stacked body.

For example, the stacking direction can include: a first direction or a second direction, where the first direction can be parallel to a surface on which objects in a stacked body are placed; and the second direction can be perpendicular to a surface on which the objects in the stacked body are placed. Objects in the stacked body can be stacked along the first direction or the second direction.

For example, a surface on which objects in a stacked body are placed can include multiple stacking areas, and stacked bodies in the acquired different images can be placed in different stacking areas, respectively. Furthermore, the neighboring relation among objects constituting the stacked bodies in different images can also be different. For example, two images both include 1 RMB coin, 5 RMB coin, and 10 RMB coin. 5 RMB coin in one image is located in the middle of a stacked body, and 1 RMB and 10 RMB coins are located on both sides of the stacked body. 10 RMB coin in the other image is located in the middle of a stacked body, and 1 RMB and 5 RMB coins are located on both sides of the stacked body.

At step 102, an acquired image is taken as a sample image when the acquired image meets an image quality condition.

At this step, the quality of the images acquired in step 100 can be filtered to select an image meeting the image quality condition as a sample image, where the image quality condition can be set according to actual service requirements, for example, the image quality condition is that a stacked body in an image is not shielded by other objects in the image at all. The image quality condition can be achieved by setting a selecting process algorithm.

According to the method for obtaining sample images provided in the present embodiments, the item information included in the acquired sample images is relatively rich by acquiring multiple images having different item information. Moreover, the quality of the sample images can also be further improved by selecting the acquired images of better quality, so that the sample images which are of better quality and includes rich item information are used for training a neural network, and the performance of the neural network to recognizing objects in a stacked body is improved, for example, the accuracy and the generalization capability of a recognition network to recognize objects in a stacked body are improved.

With continuous development of an artificial intelligence technology, the intelligent construction is attempted to be made in a large variety of places. For example, one topic is the construction of an intelligent game place. In this case, one of requirements of the intelligent game place is to automatically recognize game currencies used in a game, for example, automatically recognize the number of game currencies. According to the method for obtaining sample images provided in embodiments of the present disclosure, the sample image acquired by this method can be used for training a game currency recognition network. The game currency recognition network is used for recognizing game currencies used in a game.

Taking acquiring images of stacked bodies in a tabletop game scene as an example below, the method for obtaining sample images in embodiments of the present disclosure is described. In an exemplary tabletop game scene, multiple players sit around a game table which includes multiple game areas. Different game areas have different game meanings. These game areas can be different stacking areas in the description below. Moreover, in a multiplayer game, users can play a game via game currencies.

For example, a user can exchange game currencies with his/her own goods, and place the game currencies in different stacking areas of the game table for playing a game. For example, a first user exchanges game currencies used in the game with multiple watercolor pens owned by him/her, and uses the game currencies to play a game in accordance with the game rule among different stacking areas of the game table. If a second user wins over the first user in the game, the watercolor pens of the first user belong to the second user. For example, the game above is suitable for pleasure of multiple family members in leisure time such as a holiday.

In the image acquisition scene of the game currency, game currencies included in different images can be different from each other in at least one of the following: the game currency denomination, the game currency type, the game currency stacking direction, the stacking area, the neighboring relation among game currencies (for example, game currencies of different denominations or different types) included in a stacked body, or the number of game currencies included in a stacked body.

For example, an image includes five game currencies which are placed by users who participate in the game in one stacking area on the left of the game table. Another image includes five game currencies which are placed in one stacking area on the right of the game table. Alternatively, an image includes three game currencies of type A and five game currencies of type B, and another image includes four game currencies of type A and seven game currencies of type C. Other examples are not described again.

Figure 2:
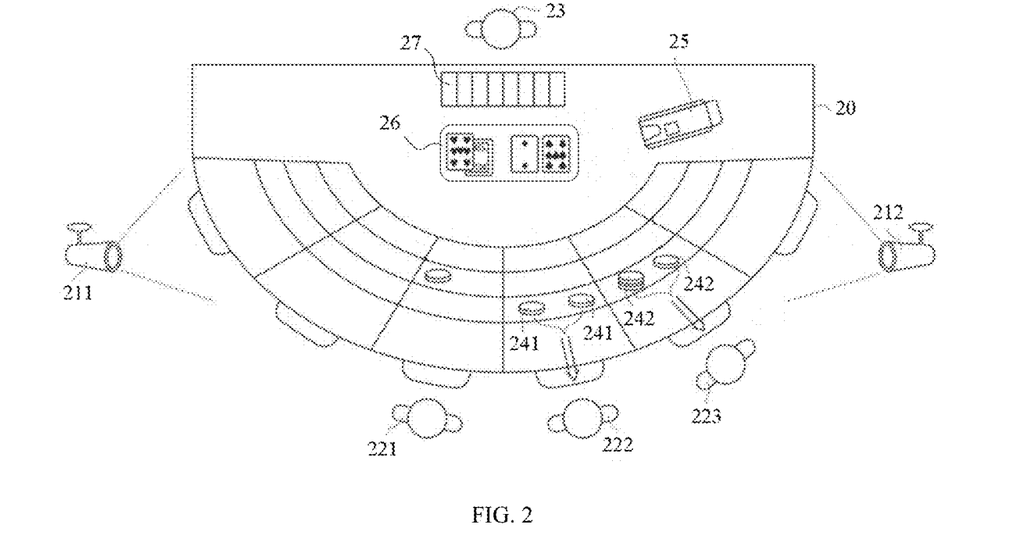
FIG. 2 is a diagram of a game table scene provided by at least one embodiment of the present disclosure.

Next, taking the game table shown in FIG. 2 as an example, a sample image acquisition method is described. As shown in FIG. 2, users can play a game on a game table 20 in a game scene, and images of game currencies placed in stacking areas of the game table are acquired by cameras 211 and 212 on both sides. A user 221, a user 222, and a user 223 who participate in the game are located at one side of the game table 20, and can be called as first users. The other user 23 who participates in the game is located at the other side of the game table 20, and can be called as a second user. The second user can be a user who is in charge of controlling the game process in the game.

At the beginning stage of the game, first users exchange game currencies from the second user with their own goods (such as watercolor pens or other goods that may be interested by users), and the second user hands over the game currencies placed in a storage area 27 to the first users. Next, the first users place the game currencies in betting areas 241, 242 of the game table, such as a betting area 241 placed by the first user 222 and a betting area 242 placed by the first user 223. During the game playing stage, a device 25 for sending poker card sends poker cards to a game playing area 26 to play the game. After the game is ended, the second user can determine the game result according to the poker cards within the game playing area 26, and adds game currencies of the first user who is a winner in the game. The storage area 27, the betting area 241, the betting area 242, etc. are called as stacking areas.

In addition, it can also be seen from FIG. 2 that the game table includes multiple betting areas such as the betting area 241 and the betting area 242. The stacking direction of game currencies in the betting area can be shown in FIG. 3, for example, multiple game currencies are stacked along a direction vertical to the game tabletop.

Figure 3:
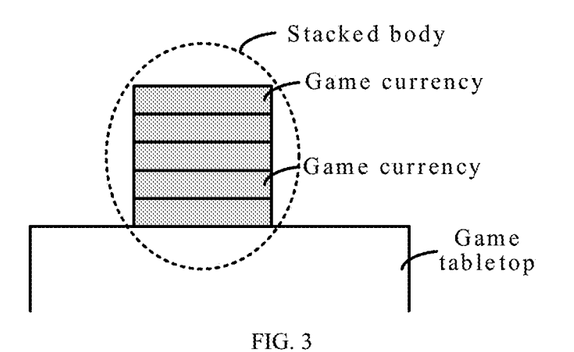
FIG. 3 is a diagram of a stacking mode of game currencies provided by at least one embodiment of the present disclosure.

As shown in FIG. 3, the stacked body includes multiple game currencies, and the stacking direction of the game currencies is along the direction perpendicular to a surface (i.e., a game tabletop) on which the stacked body is placed. An image of the stacked body can be acquired at a side view of the game tabletop. The image acquired at the side view is similar to that in FIG. 3.

By continuing referring to FIG. 2, an image acquisition apparatus can be provided around the game table for acquiring an image of game currencies placed on the game table.

The image of game currencies may be taken as a sample image for training a game currency recognition network. The image acquisition apparatus can be, for example, a camera. For example, a video stream of objects on the game table can be photographed by the camera, and video frames in the video stream are obtained to be taken as the acquired image. In an example, first image acquisition apparatuses are provided on the left and right (or multiple sides) of the game table for acquiring an image of a betting area. The game currencies in the image of the betting area are placed in the betting area. For example, the cameras (such as side cameras 211 and 212) on the left and right of the game table can acquire images of the betting area, which are similar to images in which the game currencies are placed along the stacking direction shown in FIG. 3 (which can be called as a first stacking direction).

Figure 4:
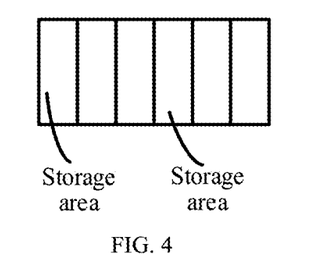
FIG. 4 is a diagram of a storage area provided by at least one embodiment of the present disclosure.

The game table can further include multiple storage areas. As illustrated in FIG. 4, multiple storage areas 27 of the game currencies are available. Each storage area 27 can be in a form of slot. The stacking direction of the game currencies in the storage area can be different from the stacking direction thereof in the betting area. For example, as illustrated in FIG. 5, multiple game currencies are horizontally arranged along a direction parallel to the game tabletop.

Figure 5:
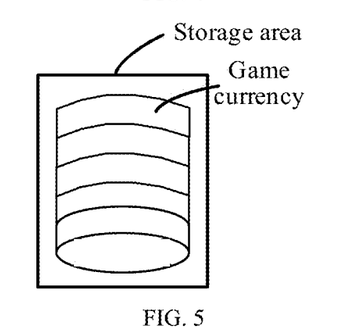
FIG. 5 is a diagram of another stacking mode of game currencies provided by at least one embodiment of the present disclosure.

As shown in FIG. 5, the stacked body includes multiple game currencies, and the stacking direction of the game currencies is along the direction parallel to a surface (i.e., a game tabletop) on which the stacked body is placed. An image of the stacked body can be acquired at an overhead/top view of the game tabletop. The image acquired at the top view is similar to that in FIG. 5. Taking an example, a second image acquisition apparatus (for example, a top mounted camera) can also be provided above the game table for acquiring an image of the storage area at an overhead view. The game currencies in the image of the storage area are placed in the storage area, and the stacking direction of the game currencies in the storage area is similar to that shown in FIG. 5 (which can be called as a second stacking direction). The stacking directions of the game currencies in the image of the betting area and the image of the storage area are different.

In an example, the image acquired by first image acquisition apparatuses can be used for training a first game currency recognition network. The first game currency recognition network is used for recognizing the denomination, the number of game currencies stacked along the first stacking direction in the betting area, etc. In an actual implementation, the first image acquisition apparatuses can include cameras on the left and right of the game table. The two cameras can photograph all the areas on the whole game table at left side view and right side view. The image acquired by a second image acquisition apparatus can be used for training a second game currency recognition network. The second game currency recognition network is used for recognizing information such as the denomination and the number of game currencies stacked along the second stacking direction in the storage area. In an actual implementation, the second image acquisition apparatus can include a camera above the game table. The camera can photograph all the areas on the whole game table in a bird's-eye view. Optionally, in other examples, both the game currencies in the storage area and the game currencies in the betting area can be recognized by the same game currency recognition network.

In order to improve the network performance of the game currency recognition network, the acquired image of the game currencies on the game table can be richer. In this way, the generalization capability of the trained recognition network can be improved by rich sample images and wide coverage for the game tabletop.

In some embodiments, N image subsets can be acquired, where each image subset can include multiple images; stacked bodies in images of the same image subset have the same first attribute; the first attribute is one of the value and the type; N is a natural number; stacked bodies in images of different image subsets have different first attributes. Moreover, the attributes of stacked bodies in images of one of the N image subset include different possible combinations of second attributes, the attribute of the stacked body is determined by a second attribute of each object constituting the stacked body, and the second attribute is one of the value and the type other than the first attribute.

For example, taking one of the N image subsets as an example, the game currencies constituting stacked bodies in multiple images of the image subset are of the same type, and the denomination of the game currencies in the multiple images are different. For example, some images include game currencies having denominations of 2 RMB and 5 RMB, and some images include game currencies having denominations of 5 RMB, 7 RMB, and 10 RMB. For another example, even though the denominations of the game currencies in two images are 5 RMB, 7 RMB, and 10 RMB, the neighboring relation among game currencies of three denominations can be different, or the number of respective game currencies of the three denominations is different.

Images acquired by image acquisition apparatuses are shown below:

For example, the attribute of game currencies can include, but not limited to: the denomination and the type of a game currency.

In an example, denominations of game currencies can include multiple, such as 0.5, 2.5, 5, 10, 25, 50, 100, 500, 1,000, 5,000, and 10,000. Types of game currencies can include multiple, for example, game currencies used in different game places belong to different types. In an example, tens of types are included. Game currencies of different types can have different quantities and different denominations, for example, game currencies of one type can include eight denominations of 10, 25, 50, 100, 500, 1,000, 5,000, and 10,000.

Based on the game currencies of multiple denominations and types, the richness of the acquired images of the game currencies placed in the storage area or the betting area is respectively described below. For the betting area or the storage area, the item information of stacked bodies in the images of the acquired image set can be different. The item information of the stacked body can include the attribute of the stacked body and the stacking mode thereof. As mentioned above, the attribute of the stacked body can be the denomination or the type of the game currencies in the stacked body, and the stacking mode of the stacked body can include the stacking direction of the game currencies, the stacking area, the neighboring relation among game currencies constituting the stacked body, and the number of game currencies in the stacked body.

Image Acquisition of Game Currencies in the Betting Area:

In an example, the acquired image set can include a first image subset which can include multiple first images. The first attribute of game currencies in different first images is the same, and the number of game currencies and/or the stacking areas in which the game currencies are located in different first images are different. For example, taking the first attribute being the denomination of game currencies as an example, the denomination of game currencies in different first images is the same, while the number of game currencies and/or the stacking areas where the game currencies in different first images are located are different.

For example, by comparing different images in the acquired image set, multiple denomination mixing modes can be included in these different images. The denomination mixing mode can be mixing game currencies which have different denominations and are of the same type.

A. Mixing of one denomination: for example, assuming that game currencies of the same type include eight denominations of 10, 25, 50, 100, 500, 1,000, 5,000, and 10,000. In an example, a denomination (for example, 100 is selected from the eight denominations) is included in a first image subset. The first image subset can include 20 first images which are acquired for game currencies vertically stacked in the betting areas. The number of game currencies in different first images gradually increases, and the betting areas in which the game currencies are located are also different. For example, a first image in the first image subset includes one game currency located in betting area Z1 of the game table; a second first image in the first image subset includes two game currencies located in betting area Z2 of the game table; a third first image in the first image subset includes three game currencies located in betting area Z3 of the game table, etc.

B. Mixing of two denominations: for example, any two of eight denominations of the same type can be selected, and a total of 28 selections can be made, for example, "100 and 500", "10 and 25", etc. More examples are omitted. A second image subset can be acquired in any one of the selections. The second image subset includes multiple second images. The game currencies in each second image include identical two denominations, and the number of game currencies of respective denominations and/or the stacking areas in which the game currencies are located are different. Taking a combination of two denominations "100 and 500" as an example:

a second image p1: starting from the game tabletop, when viewing the stacked game currencies from bottom to top, 1 game currency of the denomination 500 is on the bottom, i.e., on the game tabletop, and 19 game currencies of the denomination 100 are stacked above the game currency of the denomination 500. That is, such stacking mode relates to placing game currencies of the large denomination on the bottom, and placing game currencies of the small denomination on the top. The total number of game currencies of the two denominations is 20. The game currencies in the second image P1 are placed in betting area Z1;

a second image p2: 2 game currencies of the denomination 500 and 18 game currencies of the denomination 100 are included and located in betting area Z2;

a second image p3: 3 game currencies of the denomination 500 and 17 game currencies of the denomination 100 are included and located in betting area Z3;

a second image p4: 4 game currencies of the denomination 500 and 16 game currencies of the denomination 100 are included and located in betting area Z4;

in a similar way, more examples are omitted until the second image includes 19 game currencies of the denomination 500 and 1 game currency of the denomination 100.

For each of the 28 selections, two denominations in the selection can be used for image acquisition by the mixing mode above, so that the game currencies of respective denominations in different second images have different quantities of objects in different stacking areas.

C. Mixing of three denominations: any three of eight denominations of the same type can be selected, and a total of 56 selections can be made, for example, "100, 500 and 1,000", "10, 25 and 50", etc. More examples are omitted. A third image subset including multiple third images can be acquired in any one of the selections. The game currencies in each third images of the third image subset include identical three denominations, and the number of game currencies of at least one denomination and/or the stacking areas in which the game currencies are located are different. Taking a combination of three denominations "100, 500 and 1,000" as an example:

a third image M1: starting from the game tabletop, when viewing the stacked game currencies from bottom to top, a game currency of the large denomination is on the bottom, a game currency of the small denomination is on the top, and the total number of game currencies of three denominations is 20. In an example, 1 game currency of the denomination 1,000, 1 game currency of the denomination 500 and 18 game currencies of the denomination 100 are included in the third image M1, and the game currencies in the third image M1 are stacked in betting area Z1;

a third image M2: 1 game currency of the denomination 1,000, 2 game currencies of the denomination 500, and 17 game currencies of the denomination 100 are included and located in betting area Z2;

a third image M3: 1 game currency of the denomination 1,000, 3 game currencies of the denomination 500, and 16 game currencies of the denomination 100 are included and located in betting area Z3;

a third image M4: 2 game currencies of the denomination 1,000, 3 game currencies of the denomination 500, and 15 game currencies of the denomination 100 are included and located in betting area Z4;

Other combination modes are not described in details. In a word, the number of game currencies of at least one denomination and/or the stacking area in which the game currencies are located in different third images are different.

Images having mixing modes of three denominations, two denominations, etc. are listed above. Mixing modes of four denominations, five denominations, etc. can also be included, and are not described in details. Each mixing mode corresponds to an image subset. the number of game currencies of at least one denomination and/or the stacking area of game currencies may be different in different images of the image subset.

In addition, the difference among different images in the acquired image set (including multiple image subsets) can also include that different mixing modes are used for the type of game currencies in stacked bodies of different images. The type mixing mode can be mixing game currencies which have the same denomination and are of different types.

The type mixing mode is similar to the denomination mixing mode above. Taking an example below for illustration.

For example, for mixing of game currencies of two types, two types of the same denomination can be selected from eight types, and a total of 28 selections can be made. A fourth image subset can be acquired in any one of the selections. The fourth image subset includes multiple fourth images in which game currencies include identical two types X1 and X2, and the number of game currencies of respective types and/or the stacking areas in which the game currencies are located in the fourth images are different.

A fourth image N1: starting from the game tabletop, when viewing the stacked game currencies from bottom to top, 1 game currency of type X1 is on the bottom, i.e., on the game tabletop, and 19 game currencies of type X2 are stacked above the game currency of type X1. That is, such stacking mode relates to placing game currencies of type X1 on the bottom, and placing game currencies of type X2 on the top. The total number of game currencies of two types is 20. The game currencies in the fourth image N1 are placed in betting area Z1;

a fourth image N2: 2 game currencies of type X1 and 18 game currencies of type X2 are included and located in betting area Z2;

a fourth image N3: 3 game currencies of type X1 and 17 game currencies of type X2 are included and located in betting area Z3;

a fourth image N4: 4 game currencies of type X1 and 16 game currencies of type X2 are included and located in betting area Z4;

in a similar way, more examples are omitted until the fourth image includes 19 game currencies of type X1 and 1 game currency of type X2.

Image Acquisition of Game Currencies in the Storage Area:

The difference among different images in the acquired image set (including multiple image subsets) can also be that different mixing modes are used for the denomination and the type of game currencies in the storage area of different images, which is similar to the mixing modes of the game currencies in the betting area.

The mixing mode of three denominations is shown as an example:

The mixing mode of three denominations in the storage area may correspond to a fifth image subset including multiple fifth images. For example, a fifth image has multiple storage areas. 60 game currencies can be placed in storage area C1, and include three denominations. 20 game currencies of each denomination are included.

In another fifth image, 55 game currencies are placed in storage area C1, and five game currencies are placed in storage area C2 adjacent to storage area C1. The five game currencies can be obtained by randomly extracting from the 60 game currencies and placed in storage area C2.

In still another fifth image, 53 game currencies are placed in storage area C1, and seven game currencies are placed in storage area C2 adjacent to storage area C1. Compared with another fifth image, the increased two game currencies in storage area C2 can be obtained by randomly extracting from the 55 game currencies and placed in storage area C2.

In a similar way, the operation is made until storage area C1 in a fifth image is blank, and 60 game currencies are placed in storage area C2, i.e., 60 game currencies in storage area C1 are all transferred to storage area C2. The game currencies are then continued moving from storage area C2 to storage area C3 adjacent to storage area C2 by the moving mode above, and multiple fifth images in the transfer process are obtained. The game currencies in different fifth images have identical three denominations. However, these denominations correspond to different quantities of game currencies in different storage areas.

The richness of the acquired image is exemplarily described above. Game currencies having different item attributes are more balanced in the acquired images by the above mixing modes. For example, there is no big difference between the number of game currencies of the large denomination in the acquired image set and the number of game currencies of the small denomination in the acquired image set. For another example, the image set can further include a large variety of combinations of game currencies of different denominations or different types.

For images obtained by the method of obtaining sample images provided by embodiments of the present disclosure, the item information of game currencies in the images is distributed uniformly, and the images include relatively comprehensive data. For example, the images of game currencies of different denominations or different types are acquired, the number of game currencies of different denominations not significantly different from each other, and the number of game currencies of different types is not significantly different from each other. The problems such as "the number of game currencies of the large denomination in the images is one hundredth even one thousandth as the number of game currencies of the common small denomination in the images" and "uncommon combinations of game currencies of some large denominations and game currencies of some small denominations hardly appear or even never appear", do not exist.

In an example, a distribution condition of game currency information can also be set, and the distribution data of the game currency information in the acquired image set is obtained. If the distribution data does not meet the distribution condition, a missing image can be continued acquiring, and can be an image of a stacked body having missing item information not included in the distribution data but included in the predetermined distribution condition.

For example, the distribution condition can be "the following image of game currencies does not exist: the percentage of the number of images of game currencies of a denomination in the total number of images in the image set is lower than 2%." Therefore, if it is found that the percentage of the number of images of game currencies of the denomination 100 in the total number of images in the image set is 1%, images of game currencies of the denomination 100 can be continued acquiring. These images of game currencies of the denomination 100 are missing images.

After the missing image is acquired, the quality of the missing image can also be filtered and when the missing images meets the image quality condition, the missing image is to selected as a sample image.

The following example shows how to select an image having good quality as a sample image. Some of the acquired images have relatively bad quality, and are not suitable for training the game currency recognition network. For example, game currencies in some images are shielded by a hand of a user, and some basis information of the game currencies for recognizing the type or the denomination is shielded. Efficient recognition cannot be carried out when the shielded images are used for training networks. Therefore, after the image set of game currencies used in a game is acquired, images can be filtered according to the image quality condition to select an image having good quality as a sample image for training a game currency recognition network.

For example, a method for selecting images can include: first determining bounding boxes of target objects in the acquired image, the target objects including a stacked body; multiple bounding boxes in the image being included, for example, some bounding boxes including the stacked body, and some bounding boxes including other target objects other than the stacked body in the image; next, when it is determined that an Intersection over Union (IoU) between the bounding box of the stacked body and a bounding box of each of other target objects (for example, the target object can be a hand of a user who participates in the game) is less than a first predetermined threshold (e.g. 50%), determining that the image is suitable for being taken as a sample image for training a game currency recognition network. Such selecting method relates to selecting an image in which a stacked body is shielded as less as possible as a sample image to avoid the influence of the shielding of the stacked body on network training.

In another example, after determining that an Intersection over Union between the bounding box of the stacked body and the bounding box of each of other target objects is less than the first predetermined threshold, it can be continued determining whether a ratio of a length of an overlapping area of a first bounding box and a second bounding box in a direction perpendicular to the stacking direction of the stacked body to a length of a first bounding box in the direction perpendicular to the stacking direction of the stacked body is less than a second predetermined threshold, where the first bounding box is a bounding box of the stacked body, and the second bounding box is a bounding box of each of other target objects other than the stacked body in an image. In an example, the target object in the second bounding box can be a hand. The length of the overlapping area of the first bounding box and the second bounding box in the direction perpendicular to the stacking direction of the stacked body can indicate a width of game currencies shielded by the hand. The length of the first bounding box in the direction perpendicular to the stacking direction of the stacked body can indicates a width of the stacked body. For example, assuming that there is only one the other target objects in the image and the other target object is a hand, if the ratio of the width of game currencies shielded by the hand to the width of the stacked body is less than the second predetermined threshold (for example, the width of game currencies shielded by human hands is 50%), it is determined that the image can be taken as a sample image.

According to the method for obtaining sample images in embodiments of the present disclosure, game currencies included in the acquired image are shielded by other objects as less as possible by filtering the quality of the acquired image, and have a higher quality so as to facilitate improving the performance of a network trained by the sample images.

Figure 6:
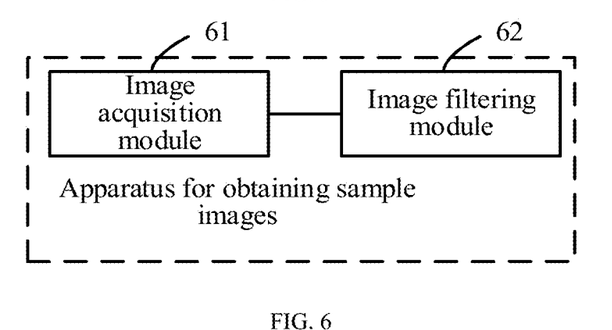
FIG. 6 is a diagram of an apparatus for obtaining sample images provided by at least one embodiment of the present disclosure.

FIG. 6 is the structure of an apparatus for obtaining sample images provided by an exemplary embodiment of the present disclosure. The apparatus can be configured to implement a method for obtaining sample images in any one of embodiments of the present disclosure. As shown in FIG. 6, the apparatus can include: an image acquisition module 61 and an image filtering module 62.

The image acquisition module 61 is configured to acquire images of stacked bodies, where the stacked bodies in different images have different item information, and the item information includes: an attribute and a stacking mode of a stacked body.

The image filtering module 62 is configured to take an acquired image as a sample image when the acquired image meets an image quality condition.

In an example, the image acquisition module 61 is further configured to acquire a missing image when it is determined that the distribution data of item information of stacked bodies in sample images of a sample image set does not meet a predetermined distribution condition, where the missing image is an image of a stacked body having missing item information not included in the distribution data but included in the predetermined distribution condition; the sample image set including multiple sample images.

In an example, the image filtering module 62 is further configured to take the missing image as a sample image when the missing image meets the image quality condition.

In an example, the stacking mode includes: a stacking direction, a stacking area, a neighboring relation among objects constituting the stacked body, and the number of objects in the stacked body; the attribute of the stacked body includes: a value represented by each object constituting the stacked body and a type of each object; stacked bodies in different sample images are different from each other in at least one of: a stacking direction, a stacking area, a neighboring relation among objects constituting a stacked body, the number of objects in a stacked body, a value represented by each object constituting a stacked body or a type of each object.

In an example, the image acquisition module 61 is configured to acquire N image subsets, where stacked bodies in images of the same image subset have the same first attribute, the first attribute is one of the value and the type, N is a natural number, and stacked bodies in images of different image subsets have different first attributes; where the attributes of stacked bodies in images of one of the N image subsets include different possible combinations of second attributes, the attribute of the stacked body is determined by a second attribute of each object constituting the stacked body, and the second attribute is one of the value and the type other than the first attribute.

In an example, the image acquisition module 61 is configured to, when the stacking direction is parallel to a surface on which the stacked body is placed, acquire images of stacked bodies at an overhead view of the surface.

In an example, the image acquisition module 61 is configured to, when the stacking direction is perpendicular to the surface on which the stacked body is placed, acquire images of stacked bodies at a side view of the surface.

In an example, the image filtering module 62 is specifically configured to for each of target objects in the acquired image, determine a bounding box of the target object, the target objects including a stacked body; for each of the target objects other than the stacked body, determine that an Intersection over Union between a bounding box of the stacked body and a bounding box of the target object is less than a first predetermined threshold; and take the acquired image as the sample image.

In an example, the image filtering module 62 is configured to, after determining that the Intersection over Union between the bounding box of the stacked body and the bounding box of each of the target objects other than the stacked body is less than the first predetermined threshold, and before taking the acquired image as the sample image, take the bounding box of the stacked body as a first bounding box; for each of the target objects other than the stacked body in the acquired image, take the bounding box of the target object as a second bounding box; determine that a ratio of a length of an overlapping area between the first bounding box and the second bounding box in a direction perpendicular to a stacking direction of the stacked body to a length of the first bounding box in the direction perpendicular to the stacking direction of the stacked body is less than a second predetermined threshold.

Also provided in the present disclosure is an electronic device, including a memory and a processor, where the memory is configured to store computer instructions runnable on the processor, and the processor is configured to implement the method for obtaining sample images according to any one of embodiments of the present disclosure when executing the computer instructions.

The present disclosure also provides a computer-readable storage medium. A computer program is stored thereon, and when the program is executed by a processor, the method for obtaining sample images according to any one of embodiments of the present disclosure is implemented.

A person skilled in the art should understand that one or more embodiments of the present disclosure may provide a method, a system or a computer program product. Therefore, one or more embodiments of the present disclosure may take the forms of hardware embodiments, software embodiments, or embodiments in combination with software and hardware. Moreover, one or more embodiments of the present disclosure may use the form of the computer program product implemented over one or more computer usable storage media (including but not limited to a disk memory, a CD-ROM, and an optical memory, etc.) that include computer usable program codes.

Embodiments of the present disclosure further provide a computer-readable storage medium, having a computer program stored thereon, where when the program is executed by a processor, steps of the method for obtaining sample images described in any one of embodiments of the present disclosure are implemented. In addition, the term "and/or" in the present disclosure means at least one of the two, e.g., "A and/or B" includes three schemes: A, B, and "A and B".

The embodiments in the present disclosure are all described in a progressive manner, for same or similar parts in the embodiments, refer to these embodiments, and each embodiment focuses on a difference from other embodiments. In particular, data processing device embodiments are substantially similar to method embodiments and therefore are only described briefly, and for the associated part, refer to the descriptions of the method embodiments.

The specific embodiments of the present disclosure are described above. Other embodiments are within the scope of the appended claims. In some cases, actions or steps described in the claims may be performed in an order different from that in the embodiments and can still achieve a desired result. In addition, the processes described in the accompanying drawings do not necessarily require a specific order shown or a sequential order to achieve the desired result. In some implementations, multi-task processing and parallel processing may also be performed or may be advantageous.

The embodiments of the subject matter and functional operations described in the present disclosure may be implemented in digital electronic circuitry, tangible computer software or firmware, computer hardware including the structures disclosed in the present disclosure and structural equivalents thereof, or a combination of one or more thereof. The embodiments of the subject matter described in the present disclosure may be implemented as one or more computer programs, i.e., one or more modules of computer program instructions encoded on a tangible non-transitory program carrier to be executed by a data processing apparatus or to control operations of the data processing apparatus. Alternatively or additionally, the program instructions may be encoded on artificially generated propagated signals, such as machine-generated electrical, optical or electromagnetic signals, generated to encode and transmit information to a suitable receiver apparatus for execution by the data processing apparatus. The computer storage medium may be a machine-readable storage device, a machine-readable storage substrate, a random or serial access memory device, or a combination of one or more thereof.

The processes and logic flows described in the present disclosure can be performed by one or more programmable computers executing one or more computer programs to perform corresponding functions by performing operations according to input data and generating output. The processes and logic flows may also be performed by a special logic circuit, such as a Field Programmable Gate Array (FPGA) or an Application Specific Integrated Circuit (ASIC), and the apparatus may also be implemented as a special logic circuit.

The computer suitable for executing the computer program includes, for example, a general-purpose microprocessor and/or a special-purpose microprocessor, any other type of central processing unit. Generally, the central processing unit receives instructions and data from a read-only memory and/or a random access memory. Basic components of the computer include a central processing unit for implementing or executing instructions and one or more memory devices for storing instructions and data. Generally, the computer further includes one or more large-capacity storage devices for storing data, for example, a magnetic disk, a magneto-optical disk, or an optical disk, or the computer is operably coupled to the large-capacity storage device to receives data therefrom or transmit data thereto, or receive data therefrom and transmit data therefrom. However, the computer does not necessarily include such a device. Furthermore, the computer may be embedded in another device, for example, a mobile phone, a Personal Digital Assistant (PDA), a mobile audio or a video player, a game console, a Global Positioning System (GPS) receiver, or a portable storage device, for example, a Universal Serial Bus (USB) flash drive, just a few examples provided.

A computer-readable medium suitable for storing computer program instructions and data include a non-volatile memory, a medium, and a memory device in all forms, including, for example, a semiconductor memory device (for example, an EPROM, an EEPROM, and a flash device), a magnetic disk (for example, an internal hardware or a movable disk), a magneto-optical disk, and a CD ROM and DVD-ROM disk. The processor and the memory may be supplemented by the special logic circuit or incorporated into the special logic circuit Although the present disclosure includes many specific implementation details, these should not be interpreted as limiting the scope of any disclosure or the scope of protection, and are mainly used for describing the features of specific embodiments of a specific disclosure. Some features described in multiple embodiments in the present disclosure may also be implemented in combination in a single embodiment. In addition, various features described in a single embodiment may be implemented respectively in multiple embodiments or in any suitable sub-combination. Furthermore, although the features may function in some combinations as described above and even set forth in such a way initially, one or more features from a claimed combination may be removed from the combination in some cases, and the claimed combination may relate to a sub-combination or a modification of the sub-combination.

Similarly, although operations are described in the accompanying drawings in a specific order, this should not be understood as requiring that such operations are performed in the specific order shown or in a sequential order, or that all illustrated operations are performed to achieve a desired result. In some cases, multi-task and parallel processing may be advantageous. Furthermore, the separation of various system modules and components in the embodiments above should not be understood as requiring such separation in all embodiments, and it should be understood that the described program components and systems can generally be integrated together in a single software product or packaged into multiple software products.

Thus, specific embodiments of the subject matter have been described. Other embodiments are within the scope of the appended claims. In some cases, the actions described in the claims can be performed in a different order and still achieve the desired result. In addition, the processes described in the accompanying drawings do not necessarily require a specific order shown or a sequential order to achieve the desired result. In some cases, multi-task and parallel processing may be advantageous.

The above descriptions are only some embodiments of one or more embodiments of the present disclosure and are not intended to limit one or more embodiments of the present disclosure. Any modifications, equivalent substitutions and improvements made without departing from the spirit and principle of one or more embodiments of the present disclosure are intended to be included within the scope of one or more embodiments of the present disclosure.

The invention claimed is:

1. A method for obtaining sample images, comprising:
   acquiring images of stacked bodies, wherein the stacked bodies in different images have different item information, and the item information comprises: an attribute and a stacking mode of a stacked body;
   taking an acquired image as a sample image when the acquired image meets an image quality condition;
   determining that distribution data of item information of stacked bodies in sample images of a sample image set does not meet a predetermined distribution condition, the sample image set comprising multiple sample images; and
   acquiring a missing image which is an image of a stacked body having missing item information not included in the distribution data but included in the predetermined distribution condition.

2. The method according to claim 1, wherein after acquiring the missing image, the method further comprises:
   taking the missing image as a sample image when the missing image meets the image quality condition.

3. The method according to claim 1, wherein,
   the stacking mode of the stacked body comprises: a stacking direction, a stacking area, a neighboring relation among objects constituting the stacked body, and a number of the objects in the stacked body;
   the attribute of the stacked body comprises: a value represented by each object constituting the stacked body and a type of each object; and
   the stacked bodies in the different sample images are different from each other in at least one of:
      the stacking direction, the stacking area, the neighboring relation among the objects constituting the stacked body, the number of the objects in the stacked body, or the value represented by each object constituting the stacked body and the type of each object.

4. The method according to claim 3, wherein acquiring the images of the stacked bodies comprises:
   acquiring N image subsets, wherein stacked bodies in images of a same image subset have a same first attribute, the first attribute is the value or the type, N is a natural number, and stacked bodies in images of different image subsets have different first attributes; and
   wherein the attributes of stacked bodies in images of one of the N image subsets include different combinations of second attributes, the attribute of the stacked body is determined by a second attribute of each object constituting the stacked body, and the second attribute is one of the value and the type other than the first attribute.

5. The method according to claim 3, wherein when the stacking direction is parallel to a surface on which the stacked body is placed, acquiring the images of the stacked bodies comprises:

acquiring the images of the stacked bodies at an overhead view of the surface.

6. The method according to claim 3, wherein when the stacking direction is perpendicular to a surface on which the stacked body is placed, acquiring the images of the stacked bodies comprises:

acquiring the images of the stacked bodies at a side view of the surface.

7. The method according to claim 1, wherein taking the acquired image as the sample image when the acquired image meets the image quality condition comprises:

for each of first target objects that includes a stacked body in the acquired image, determining a bounding box of the first target object;

for each of second target objects that does not include the stacked body in the acquired image, determining that an Intersection over Union between a bounding box of the stacked body and a bounding box of a second target object is less than a first predetermined threshold; and taking the acquired image as the sample image.

8. The method according to claim 7, wherein after determining that the Intersection over Union between the bounding box of the stacked body and the bounding box of the second target object is less than the first predetermined threshold, and before taking the acquired image as the sample image, the method further comprises:

taking the bounding box of the stacked body as a first bounding box;

taking the bounding box of the second target object as a second bounding box; and determining that a ratio of a length of an overlapping area between the first bounding box and the second bounding box in a direction perpendicular to a stacking direction of the stacked body to a length of the first bounding box in the direction perpendicular to the stacking direction of the stacked body is less than a second predetermined threshold.

9. An electronic device, comprising:

a memory storing computer instructions, and a processor, wherein when executing the computer instructions, the processor is configured to perform actions comprising:

acquiring images of stacked bodies, wherein the stacked bodies in different images have different item information, and the item information comprises: an attribute and a stacking mode of a stacked body;

taking an acquired image as a sample image when the acquired image meets an image quality condition;

determining that distribution data of item information of stacked bodies in sample images of a sample image set does not meet a predetermined distribution condition, the sample image set comprising multiple sample images; and acquiring a missing image which is an image of a stacked body having missing item information not included in the distribution data but included in the predetermined distribution condition.

10. The electronic device according to claim 9, wherein after acquiring the missing image, the actions further comprise:

taking the missing image as a sample image when the missing image meets the image quality condition.

11. The electronic device according to claim 9, wherein, the stacking mode of the stacked body comprises: a stacking direction, a stacking area, a neighboring relation among objects constituting the stacked body, and a number of the objects in the stacked body;

the attribute of the stacked body comprises: a value represented by each object constituting the stacked body and a type of each object; and the stacked bodies in the different sample images are different from each other in at least one of:

the stacking direction, the stacking area, the neighboring relation among the objects constituting the stacked body, the number of the objects in the stacked body, or the value represented by each object constituting the stacked body and the type of each object.

12. The electronic device according to claim 11, wherein acquiring the images of the stacked bodies comprises:

acquiring N image subsets, wherein stacked bodies in images of a same image subset have a same first attribute, the first attribute is the value or the type, N is a natural number, and stacked bodies in images of different image subsets have different first attributes; and wherein the attributes of stacked bodies in images of one of the N image subsets include different combinations of second attributes, the attribute of the stacked body is determined by a second attribute of each object constituting the stacked body, and the second attribute is one of the value and the type other than the first attribute.

13. The electronic device according to claim 11, wherein when the stacking direction is parallel to a surface on which the stacked body is placed, acquiring the images of the stacked bodies comprises:

acquiring the images of the stacked bodies at an overhead view of the surface.

14. The electronic device according to claim 11, wherein when the stacking direction is perpendicular to a surface on which the stacked body is placed, acquiring the images of the stacked bodies comprises:

acquiring the images of the stacked bodies at a side view of the surface.

15. The electronic device according to claim 9, wherein taking the acquired image as the sample image when the acquired image meets the image quality condition comprises:

for each of first target objects that includes a stacked body in the acquired image, determining a bounding box of the first target object;

for each of second target objects that does not include the stacked body in the acquired image, determining that an Intersection over Union between a bounding box of the stacked body and a bounding box of a second target object is less than a first predetermined threshold; and taking the acquired image as the sample image.

16. The electronic device according to claim 15, wherein after determining that the Intersection over Union between the bounding box of the stacked body and the bounding box of the second target object is less than the first predetermined threshold, and before taking the acquired image as the sample image, the actions further comprise:

taking the bounding box of the stacked body as a first bounding box;

taking the bounding box of the second target object as a second bounding box; and determining that a ratio of a length of an overlapping area between the first bounding box and the second bounding box in a direction perpendicular to a stacking direction of the stacked body to a length of the first bounding box in the direction perpendicular to the stacking direction of the stacked body is less than a second predetermined threshold.

17. A non-transitory computer-readable storage medium, having a computer program stored thereon, wherein when the program is executed by a processor, the processor is caused to perform actions comprising:
   acquiring images of stacked bodies, wherein the stacked bodies in different images have different item information, and the item information comprises: an attribute and a stacking mode of a stacked body;
   taking an acquired image as a sample image when the acquired image meets an image quality condition;
   determining that distribution data of item information of stacked bodies in sample images of a sample image set does not meet a predetermined distribution condition, the sample image set comprising multiple sample images; and
   acquiring a missing image which is an image of a stacked body having missing item information not included in the distribution data but included in the predetermined distribution condition.

* * * * *